United States Patent
Merkl et al.

(10) Patent No.: US 6,169,583 B1
(45) Date of Patent: Jan. 2, 2001

(54) METHOD AND CIRCUIT TO DETERMINE A NOISE VALUE THAT CORRESPONDS TO THE NOISE IN A SIGNAL

(75) Inventors: Bernd Merkl, Nauheim; Jens Saenger, Dreieich, both of (DE)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 08/862,164

(22) Filed: May 22, 1997

(30) Foreign Application Priority Data

May 24, 1996 (EP) .................................................. 96108318

(51) Int. Cl.$^7$ ................................. H04N 5/21; G06K 9/40
(52) U.S. Cl. .......................... 348/607; 348/607; 348/612; 348/618; 348/620; 382/275
(58) Field of Search ..................................... 348/607, 612, 348/618, 619, 620, 621, 622, 623, 624; 382/275; H04N 5/21, 5/213

(56) References Cited

U.S. PATENT DOCUMENTS

| | | | |
|---|---|---|---|
| 4,249,210 | * 2/1981 | Storey et al. | 348/623 |
| 4,796,088 | * 1/1989 | Nishimura et al. | 348/620 |
| 4,873,574 | * 10/1989 | Darby | 348/620 |
| 5,025,316 | * 6/1991 | Darby | 348/620 |
| 5,105,207 | * 4/1992 | Iizuka et al. | 348/607 |
| 5,105,275 | * 4/1992 | Iizuka et al. | 358/167 |
| 5,185,664 | * 2/1993 | Darby | 358/167 |
| 5,241,370 | * 8/1993 | Desor | 348/607 |
| 5,268,760 | * 12/1993 | Suyama | 358/167 |
| 5,294,979 | 3/1994 | Patel et al. . | |
| 5,387,946 | * 2/1995 | Knee | 348/622 |
| 5,657,401 | * 8/1997 | De Haan et al. | 348/618 |
| 5,684,720 | * 11/1997 | Hein | 348/618 |
| 5,742,355 | * 4/1998 | De Haan et al. | 348/607 |
| 5,867,228 | * 2/1999 | Miki et al. | 348/624 |

FOREIGN PATENT DOCUMENTS

| | | |
|---|---|---|
| 31 21 611 | 12/1982 | (DE) . |
| 43 41 760 | 6/1995 | (DE) . |
| 54-118727 | 9/1979 | (JP) . |
| 58-24275 | 2/1983 | (JP) . |
| 59-45770 | 3/1984 | (JP) . |
| 62-1379 | 1/1987 | (JP) . |
| 62-172879 | 7/1987 | (JP) . |
| 3-72787 | 3/1991 | (JP) . |
| 4-3666 | 1/1992 | (JP) . |
| 5-244565 | 9/1993 | (JP) . |
| 7-30786 | 1/1995 | (JP) . |
| 95/24785 | 9/1995 | (WO) . |

* cited by examiner

*Primary Examiner*—John K. Peng
*Assistant Examiner*—Paulos M. Natnael
(74) *Attorney, Agent, or Firm*—Wenderoth, Lind & Ponack, L.L.P.

(57) ABSTRACT

A method and circuit for determining a noise value that corresponds to the noise in a signal, the signal containing identical signal parts in the noise free signal. Noise values that correspond to the noise in a signal can be used to control noise reduction filters as well as other digital improvement circuits, and in particular picture improvement circuits. This is of particular interest for digital signal processing in modern television receivers. The invention helps to use-picture improvement algorithms that exist in modern digital television receivers more efficiently.

10 Claims, 4 Drawing Sheets

METHOD AND CIRCUIT TO DETERMINE A NOISE VALUE THAT CORRESPONDS TO THE NOISE IN A SIGNAL

BACKGROUND OF THE INVENTION

1. Field of the Invention

The invention relates to a method and a circuit to extract from a signal, in particular a digitized video signal, a value that corresponds to the noise in a signal.

Noise values that correspond to the noise in a signal can be used to control noise reduction filters as well as other digital improvement circuits, in particular picture improvement circuits. This is of special interest for digital signal processing in modern television receivers. The invention helps to use picture improvement algorithms that exist in modern digital television receivers (e.g. noise reduction, peaking, CTI, contour correction) more efficiently. To obtain a meaningful noise value the used methods and means have to discriminate between the noise and the signal.

2. Description of Related Art

As described in "Automatic Assessment of Signal-to-thermal noise ratio of Television Images" by Qui Zhang and Rabab Ward published in IEEE Transactions on Consumer Electronics, Vol. 41, No. 1 on February 1995, cable providers measure in the frequency domain the amount of energy in the guard band, wherein the guard band is the portion of the bandwidth between two consecutive channels within a continuous frequency range. The measured energy is assumed to correspond to the noise in the picture. The noise in the guard band does not necessarily reflect the noise in the picture. Additionally, the extreme expensive use of a spectrum analyzer which is necessary for such a method is a disadvantage.

Modern television receivers are using in the front-end a so-called 'automatic gain control' (AGC) which measures the amplitudes of the sync or burst signal. The amplitudes are assumed to correspond to the noise in the signal. But since this is not a real measurement of the noise even a noisy picture which has been recorded by using a bad camera or a cheap VCR can contain a correct sync amplitude.

In another method, particularly used by broadcasters and cable providers, test signals are inserted in the field retrace time or during the first lines of a field. Thus, the signal is known in advance and it is easy to separate the noise from the signal. But these test signals cannot be used in television receivers because each cable provider and broadcaster uses different test signals and positions in the CVBS signal to check the manner of transmission (from antenna via air, cable, satellite). This technique cannot assess the noise in the picture but only the amount of noise added during transmission.

SUMMARY OF THE INVENTION

It is a general object of the present invention to provide a method and a circuit that can extract from a signal a value that corresponds to the noise in the signal.

Preferred embodiments of the present invention aim to provide a noise measurement method and circuit that can extract from a digitized video signal a value that corresponds to the noise in the video signal to control digitized picture improvement circuits. With such a noise value picture improvement, algorithms can perform more efficiently. The improvement algorithms may, for example, be noise reduction algorithms, peaking algorithms, CTI algorithms, or contour correction algorithms.

Noise reduction algorithms can reduce the noise level in a picture to a level which is more pleasing to the viewer. Peaking algorithms can emphasize the high frequency portion of the video signal to improve the impression of sharpness. But if the video signal has a high level of noise, the emphasis of a high frequency portion would as well lead to an undesirably increased visibility of noise. The application of peaking algorithms can be made more efficient by the use of noise values. The same is true for the application of CTI algorithms. CTI algorithms (Color Transient Improvement) produce a sharper impression at color transitions. But to apply such algorithms first the color transitions have to be detected. The lower the noise level is in a video signal, the better algorithms for detecting color transitions perform and the more the detected color transitions are reliable. Since the reliability of the transition detection depends to a high degree on the noise level in the signal, CTI applications controlled by a noise value could be applied more efficiently.

Modern television receivers usually comprise means for automatic search tuning. Since a broadcasting station in general uses different frequencies to cover a larger area by automatic search tuning the same station will be found at different frequencies. With the help of the Videotext service broadcast with the video signal it is possible to decide automatically whether two stations found at different frequencies are the same or different ones. To decide automatically which of the found frequencies for one station should be used, the measured noise level is an appropriate criterion since the frequency having the lower noise level and correspondingly being more pleasing to the viewer should be selected.

According to a first aspect of the present invention, the noise measurement method and circuit evaluate only the absolute differences between corresponding lines in subsequent fields or frames. The evaluated pixels in the corresponding lines have a constant value from frame to frame or field to field in the noise free signal. This makes a noise measurement possible which takes place as close as possible to the real video information because it is insensitive to signals inserted in these lines as long as these signals are not varied in temporal respect. Therefore, the measured noise values can be more accurate than it has been possible with prior art techniques.

According to another aspect of the present invention, the measured noise values are filtered temporally. This ensures that short distortions in the signal, especially in the video signal, do not lead to wrong settings in the controlled features (e.g. noise reduction). Additionally, this results in a smooth change of the controlled features when the noise level changes.

According to another aspect of the present invention, extreme peak values of the measured differences are limited to make limited hardware complexity possible.

According to another aspect of the present invention, a reliability test is introduced to make a self detection of wrong measurements possible. Since extreme peak values of the differences are usually not due to noise but to other distortions or to an inserted time-varying signal, these values are not evaluated for the calculation of the noise value. This ensures an accurate noise value even if unpredictable time-variant signals occur in the evaluated line.

A noise measurement circuit according to the present invention makes a more efficient use of digital image processing algorithms possible. Such a circuit has a low hardware complexity but provides a more accurate noise measurement compared with the prior art. Since the noise measurement circuit is intended for use in digital television receivers, it works with different television standards (e.g. NTSC, PAL, PALplus, SECAM), with different sources (e.g. television signal via tuner, VCR, laser disk, set top box) and with existing and future services in vertical blanking.

BRIEF DESCRIPTION OF THE DRAWINGS

For a better understanding of the present invention, preferred embodiments of the present invention are described in detail with reference to the accompanying drawings, in which.

DESCRIPTION OF PREFERRED EMBODIMENTS

In a video signal with a constant level, differences between two neighboring pixels are caused by noise. A high level of noise in the signal results in larger differences on an average. Thus, the mean of all absolute differences represents a good indicator for the noise in the signal.

The appearance of a single noise distortion is not predictable neither in a spatial nor in a temporal respect. Therefore, a noise value which represents the noise in the signal can be evaluated equivalently by a sample of values spread temporally or spatially as long as the underlying noise free signal has a constant level in the evaluated respect. If the noise free signal is not constant in a spatial respect, e.g. in a line of pixels in a picture, but in a temporal respect, e.g. from field to field or frame to frame in a video signal, a noise value can still be measured in a spatial respect. Therefore, only the differences between corresponding signal values of subsequent fields or frames have to be evaluated.

Thus, the noise measurement, especially of a picture, is not influenced by signals which are time-invariant, i.e. of inserted test signals of broadcasters or cable providers.

Figure 1:
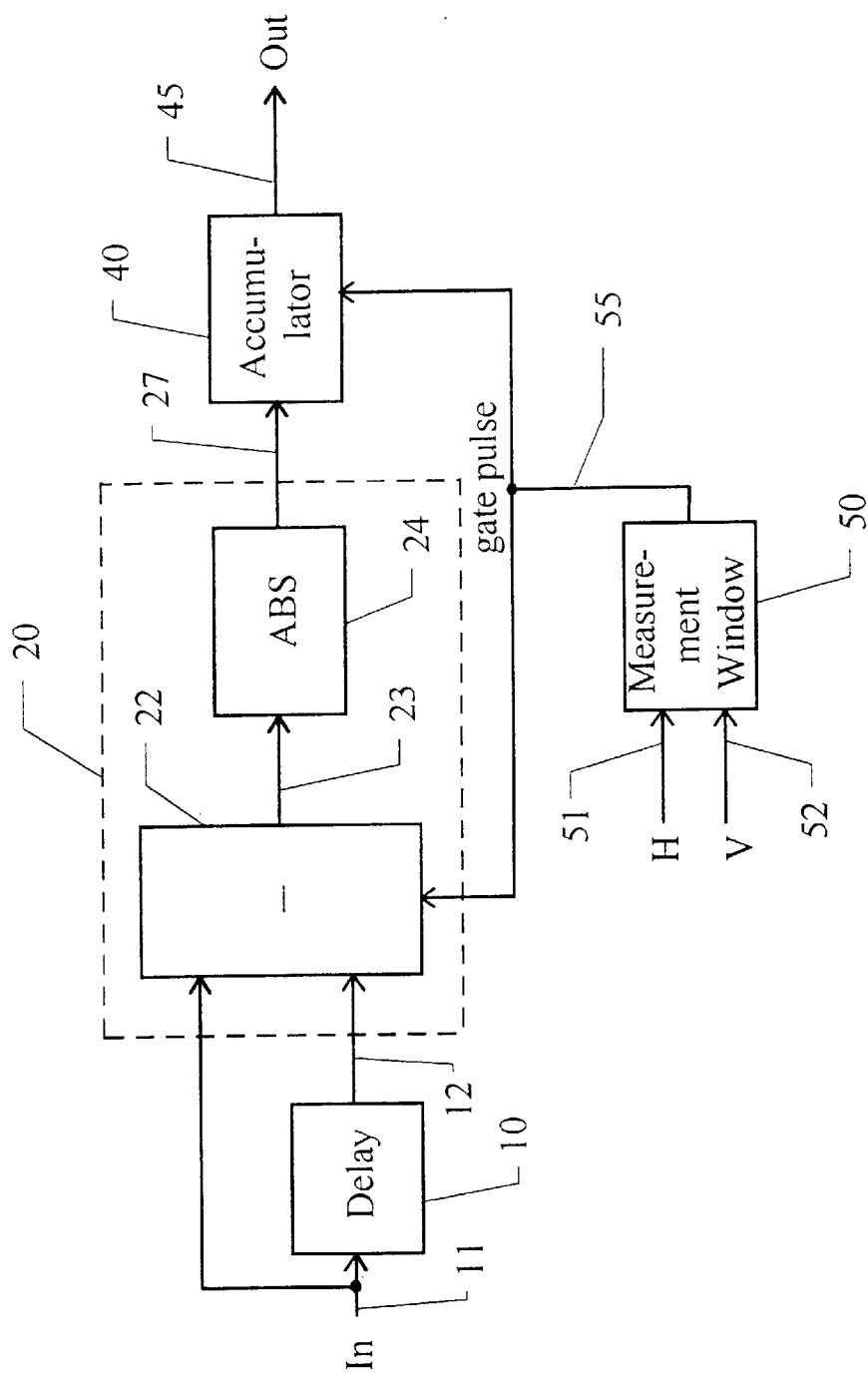
FIG. 1 shows a simplified block diagram of the invention.

FIG. 1 shows an illustrative block diagram for explaining the principle of the invented noise measurement. An incoming signal 11 is inputted into the delay means 10 and into the absolute difference means 20.

The delay means 10 is connected with the absolute difference means 20 to supply the absolute difference means 20 with the input signal delayed preferably by one cycle, e.g. one field or frame of a video signal. The delay means is preferably realized by store means for storing at least the signal parts being evaluated for the noise measurement per field or frame. The absolute difference means 20 is, in addition to the delayed signal 12, connected to the input signal 11. The delay means 10 ensures that the absolute difference means 20 is only provided with corresponding values of subsequent cycles, e.g. with corresponding values of corresponding lines of subsequent fields or frames of a video signal.

The calculation of the absolute difference in the absolute difference means 20 between corresponding values is preferably carried out by a two phase procedure. In a first step, the difference between the two supplied values (provided by 11 and 12) is calculated and provided by 23 to the absolute means 24. The absolute means 24 calculates the absolute value 27 for the provided difference value 23. The calculation of an absolute value 27 of the calculated difference 23 is indispensable since the mean of the noise to be measured is assumed to be zero.

All calculated absolute differences between corresponding values of identical signal parts of subsequent fields or frames are supplied by the absolute difference means 20 or the absolute means 24 to the accumulator means 40. The accumulator 40 is adding up all absolute differences calculated for every field or frame and it is providing by 45 the sum, i.e. a noise value representing the noise in the current field or frame of the signal.

The selection of the values to be evaluated per field or frame for the noise measurement is controlled by a gate pulse 55 of a measurement window means 50 which is connected to at least one of the difference means 22, the absolute means 24 and the accumulator means 40, and is preferably connected to the difference means and the accumulator means. A calculation or adding procedure of the connected means is initiated by the gate pulse 55 which is derived from the predetermined positions of the values which are evaluated, e.g. from the H-Sync 51 and V-Sync 52 of a video signal.

Figure 2:
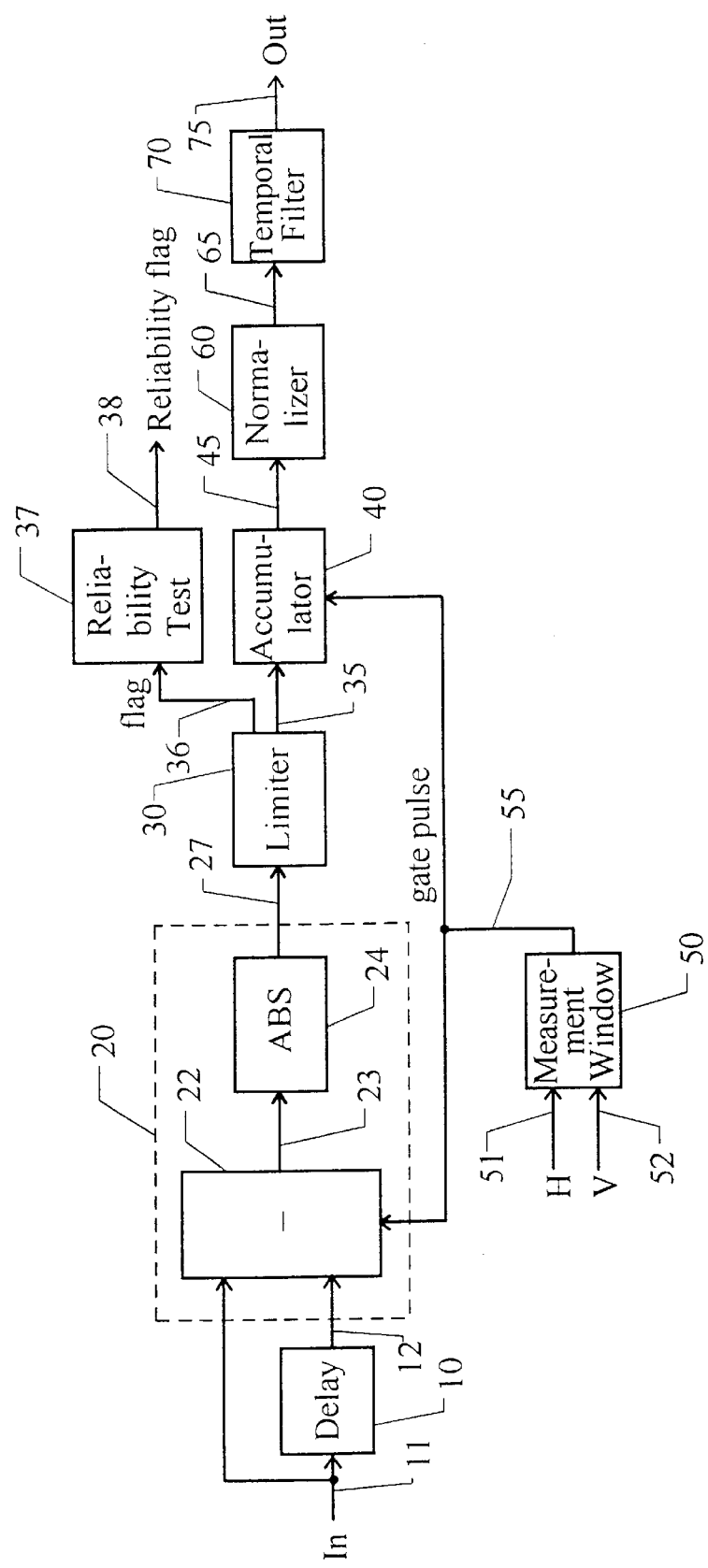
FIG. 2 shows a general block diagram of the invention.

An improved embodiment of the invention is shown in FIG. 2. New blocks are inserted into the diagram compared with FIG. 1.

Figure 3:
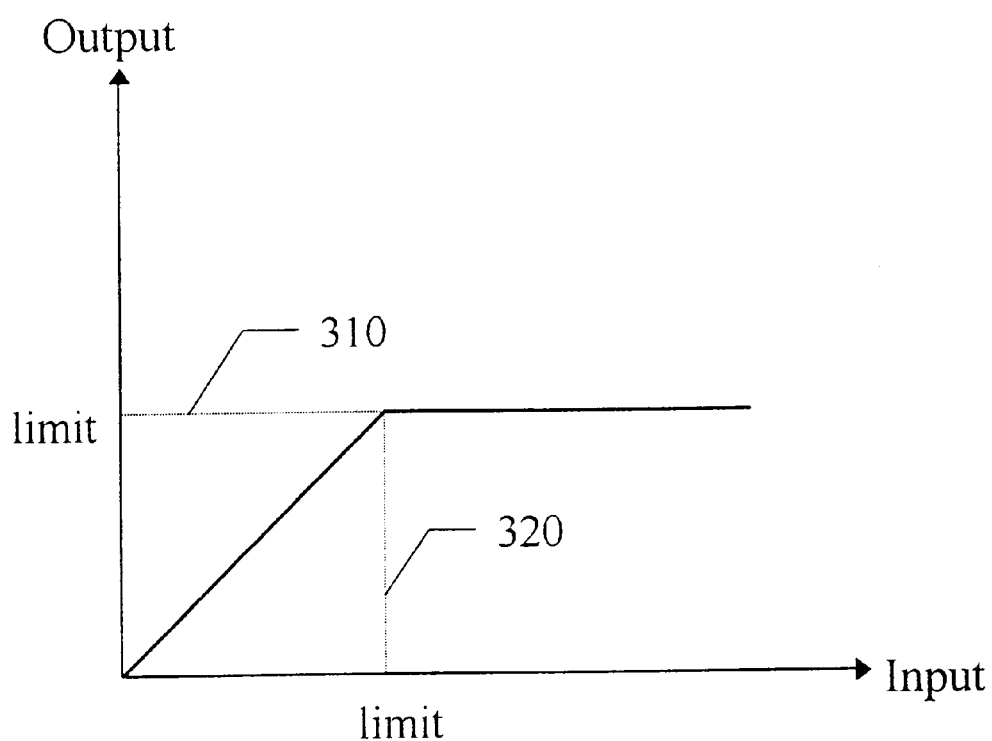
FIG. 3 shows the characteristic of a limiter means.

In order to limit hardware complexity, it is possible to implement a limiter means 30 that limits extreme peak values of the noise. The characteristic of the limiter is shown in FIG. 3. The output signal of the limiter 30 is equal to the input signal as long as the input signal does not exceed a certain limit 320 which cannot be exceeded by the output signal. An input signal which exceeds the limit 320 will produce an output signal with only the highest possible value 310. The limit is set in a range that normal and even high noise is not limited. Thus the limiter does not affect a correct noise measurement.

In another embodiment of this limiter means 30, a more complicated calculation procedure is initiated to evaluate a corresponding output value by an input value which exceeds the predetermined limit 320. It is assumed that an absolute difference which exceeds the predetermined limit 320 could not be explained by noise in the video signal. Therefore, the input value exceeding the limit 320 is omitted and replaced at the output terminal of the limiter means 30 by another absolute difference calculated in the currently evaluated field or frame, preferably by the preceding absolute difference. That is, in the evaluated line of a field or frame of the video signal, the absolute difference of the neighboring pixel which has been calculated previously.

Since the reliability of the noise value calculated per field or frame in a video signal is reduced when a certain number of absolute differences is just taken over from its predecessor, it is useful to introduce a maximum allowable percentage of executed replacements. If there are more replacements executed than allowed by the predetermined percentage limit, the calculated noise value is assumed to be invalid.

The reliability test of the measured noise value is not necessarily dependent on performed replacements. The above described reliability test can as well be applied to a less complex limiter which only limits extreme absolute differences. In this case, only a predetermined percentage of limited absolute differences is allowed for a valid noise value. This reliability test is executed by block 37 in FIG. 2. Each replacement or each time the limiter cuts the input signal a flag signal 36 is provided to the reliability test means 37. If more than 25% of the absolute differences are limited or replaced, the reliability test means 37 sets the reliability flag 38 to signal that the noise measurement for this evaluated signal part, in particular this line of a field or frame, was not reliable.

The implementation of such a reliability test has the benefit to provide a self detection of wrong noise measurements. In this case, unforeseeable time-varying signals or active video are currently introduced into the evaluated signal part of a frame, in particular into the evaluated line of a field or frame, and there is no wrong noise value outputted except a signal 38 (a reliability flag) which makes it possible for the noise measurement circuit to switch to another signal part for the noise measurement, especially to another line in a video frame.

The normalizer means 60 performs a division of the value 45 supplied by the accumulator means 40 by dividing the accumulated differences 45 by the number of accumulated differences.

Thus, the noise value 65 provided by the normalizer means 60 reflects the noise level independently of the number of absolute differences evaluated for each noise value.

The measured noise values provided by the accumulator means 40 or the normalizer means 60 respectively are filtered temporally by a filter means 70 for suppressing high frequency components in the noise value signal which represents successive measured noise values. This is performed to make sure that short distortions in the signals do not lead to wrong settings in the controlled features (e.g. noise reduction) and changes of the noise level in the signal only lead to a smooth change of the controlled features since sudden changes could be visible to the viewer.

A preferred embodiment of the present invention is a television receiver, where the video component signals (YUV) are provided from a multiform color decoder. Each signal is represented by an 8-bit value. The sampling frequency is 13.5 MHz for the luminance component Y and 6.75 MHz for the chrominance components U and V. Only the luminance signal Y of the video signals is used for the noise measurement in which 256 pixel positions are evaluated in the first half of line 23 (field A) for the PAL, PALplus and SECAM transmission standards. For the NTSC transmission standard, this measurement window is placed in the first half of line 19 in field B. The placement of the measurement window at these positions (line 23, field A for PAL, PALplus and SECAM; line 19, field B for NTSC) leads to a noise value that corresponds very much with the real noise in the picture. The evaluated line does not contain any active video information but it is very close to it. This line is always recorded on VCRs and the measured noise value therefore has a direct correlation to the noise in the reproduced video signal.

To enable PALplus receivers to perform an appropriate processing of a transmitted PALplus video signal which is compatible to a standard PAL video signal, there has to be some additional information transmitted, to indicate to the PALplus receiver, the condition of the transmitted video signal. This information, the so-called Widescreen Signaling System (WSS), is carried out in line 23 of each frame in a PALplus video signal and informs the PALplus receiver which form of filtering and picture width has been used in order to optimize the complementary process in the receiver. The WSS bits are constant from frame to frame. Since the above described noise measurement only evaluates the pixel differences between two frames, the WSS bits have no influence on the noise measurement.

Figure 4:
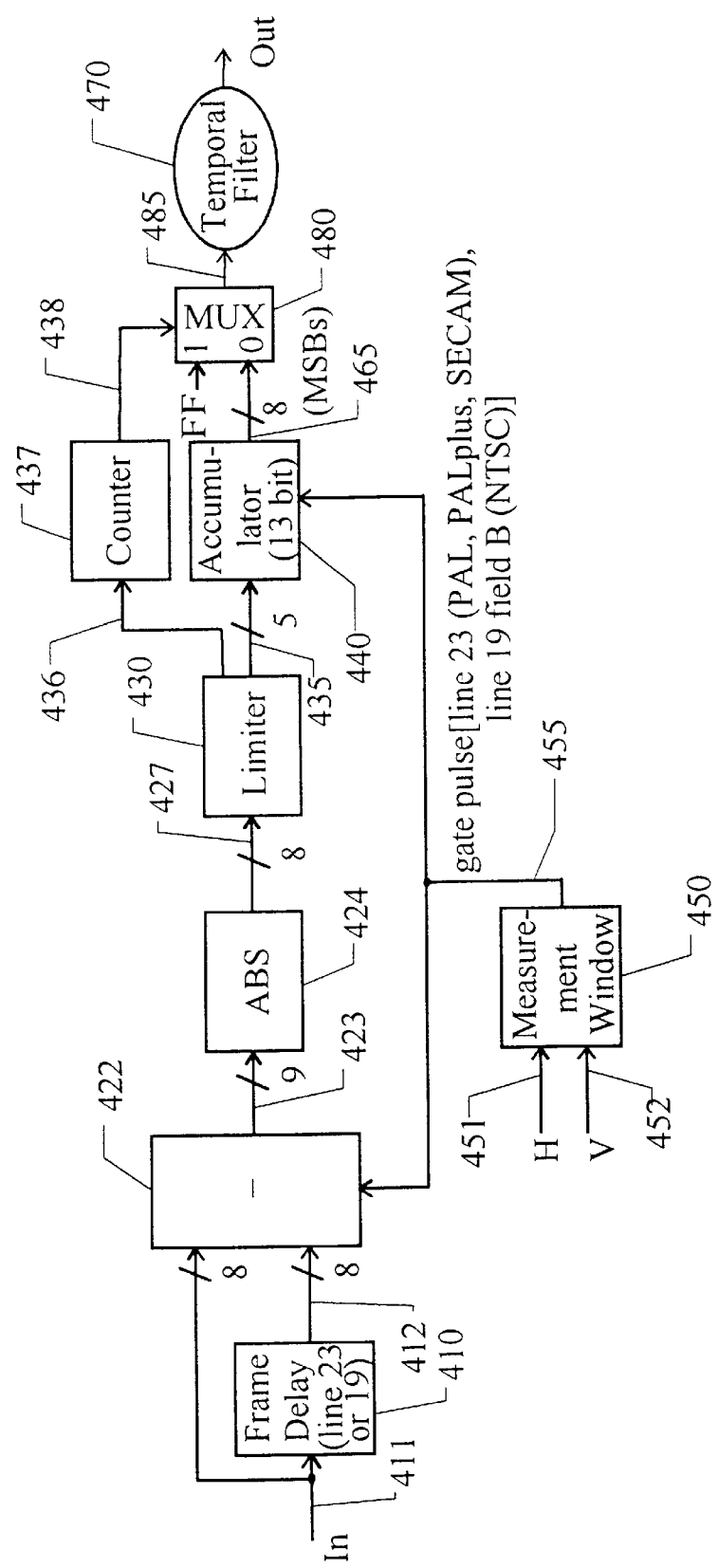
FIG. 4 shows a block diagram of a hardware realization of the invention.

A block diagram of a hardware realization of the invention is shown in FIG. 4. The numbering of the reference signs in FIG. 4 corresponds to the numbering in FIG. 1 and FIG. 2 with the difference that a 4 is placed at the beginning of the numbers in FIG. 4. The bus width for all buses shown in FIG. 4 is indicated by a slash through the line representing the bus accompanied by a number representing the number of parallel bits.

The digitized luminance signal Y 411, in which each pixel is represented by an 8-bit value, is inputted to the frame delay means 410. The difference means 422 is simultaneously provided with the 8-bit values of the current video signal 411 and the same video signal 412 delayed by one frame and provided by the delay means 410. The difference means 422 calculates the difference between the two values, which have the same horizontal and vertical position in subsequent frames, and supplies the calculated difference 423 (8-bit value with a sign bit) to the absolute means 424. The absolute means 424 calculates the absolute value 427 (8-bit value) of the difference value 423. By the limiter means 430, the maximum absolute difference is limited to the value 31. This reduces the width of the bus 435 to 5-bit.

As described above, the limiter 430 supplies an additional signal to the counter 437 each time the limiter does not pass the incoming signal because it is exceeding a predetermined level. The counter 437, which is performing the reliability test of the noise measurement, counts how often the incoming signal is exceeding the predetermined level. If more than 25% of the absolute differences are exceeding the predetermined level and therefore limited, the counter 437 is outputting a '1' on lead 438. If the counter is supplying a '1' to the multiplexor 480 which is placed between the accumulator 440 and the temporal filter 470, the multiplexor 480 is not passing the accumulated absolute differences anymore, but a 'FF', signal. This value is signalizing to the controller that the measured value is not reliable and therefore not forwarded to the temporal filter 470.

The accumulator 440 accumulates the incoming values 435. The accumulation and the calculation of the differences is controlled by the measurement window means 450. The measurement window means 450 generates a gate pulse 455 which is provided to the connected means 422 and 440 to select the 256 predetermined pixels to be evaluated for the noise measurement (in line 23 for PAL, PALplus, and SECAM; in line 19 field B for NTSC). The gate pulse 455 is derived from the H-Sync 451 and V-Sync 452 of the video signal.

The bus for the accumulated signal has a width of 13-bits. But only the eight most significant bits (MSBs) are fed into the temporal filter 470 or the multiplexor 480. This corresponds to the necessary normalization. For a proper normalization, a division by, a 256 of the 13-bit value would be necessary since 256 differences are accumulated in the accumulator 440. However, since, for accuracy, some digits behind the decimal point shall be kept, a division by 32 is performed. The remaining eight digits can be understood as a floating-point value with three digits behind the decimal point.

The temporal filter 470 is realized by software in the television controller so that a time-constant of the filter can be easily changed.

The invention is not limited to the embodiment described and particularly, especially the type of signal is not limited to a video signal. Every type of signal can be used which contains identical signal parts in periodical intervals, at least in predetermined intervals. The invention can, for instance, be modified to a digital signal for information transmission which is transmitting the information in 'packages' wherein the header of those packages is containing at least some identical information.

If the time accuracy of the noise value signal is not that important, it would be sufficient to evaluate just one value per field, frame or cycle (depending on the repetition period of the identical signal part) to obtain a noise value. Such a noise value would not be very reliable per field, frame or cycle but could be made more reliable by temporal filtering. This would result in a lower time accuracy of the noise value signal but would allow a reduced hardware complexity.

The invention could even be modified to evaluate the whole active video of a frame to obtain a noise value when still pictures are transmitted. By introducing a means for evaluating the video signal for identical signal parts in corresponding fields or frames, the number and placement of evaluated pixels (identical signal parts) could be adaptively selected.

What is claimed is:

1. A method of determining a noise value that corresponds to a noise in a video signal, the video signal comprising fields or frames in periodic intervals, said method comprising:

inputting the video signal into a noise measurement apparatus, wherein the noise-free video signal comprising identical signal portions at predetermined periodic intervals, preferably per field or frame;

separating two subsequent portions of the video signal, wherein the subsequent portions correspond to the identical signal portions of the video signal;

calculating an absolute difference value between two corresponding signal values of the two separated portions of the noise-free video signal;

limiting an extreme peak value of the calculated absolute difference value to a predetermined maximum value by limiting an absolute difference value which exceeds a predetermined value;

regarding the calculated noise value for one field or frame as being invalid if more than 25% of the calculated absolute differences for one field or frame exceeding a predetermined value accumulating a predetermined number of calculated absolute difference values; and outputting an accumulated sum representing the noise value from the noise measurement apparatus.

2. A noise measurement circuit for determining a noise value that corresponds to a noise in a video signal inputted to said noise measurement circuit, the video signal comprising fields or frames in periodic intervals, said noise measurement circuit comprising:

store means for storing at least one value of the video signal, wherein the noise-free video signal comprising identical signal portions at predetermined periodic intervals, preferably per field or frame, and wherein the stored at least one value of the video signal being part of one of the identical signal portions in the noise-free video signal;

calculation means for calculating an absolute difference value of the stored value of the video signal and a corresponding value currently provided by the video signal, the corresponding value being part of a subsequent one of the identical signal portions in the noise-free video signal;

limiter means for limiting an extreme peak value of the calculated absolute difference value to a predetermined maximum value by limiting an absolute difference value which exceeds a predetermined value, and said limiter means regards the calculated noise value for one field or frame as being invalid if more than 25% of the calculated absolute differences for one field or frame exceeding a predetermined value;

accumulation means for accumulating a predetermined number of calculated absolute difference values and outputting an accumulated sum representing the noise value.

3. A noise measurement circuit as claimed in claim 2, further comprising filter means for extracting low frequency components of a noise value signal, the noise value signal being made up of successively calculated noise values.

4. A noise measurement circuit as claimed in claim 2, wherein said calculation means comprises:

difference calculation means for calculating a difference between two corresponding values of identical signal parts of subsequent fields or frames, wherein one value is supplied by the present signal, and the corresponding value by said store means; and absolute calculation means for calculating the absolute value of the calculated difference.

5. A noise measurement circuit as claimed in claim 2, wherein said limiter means receives the absolute differences from said absolute difference calculation means or said absolute calculation means.

6. A noise measurement circuit as claimed in claim 2, wherein said limiter means regards the calculated absolute difference values which exceed a predetermined value as being invalid and replaces these values respectively by the preceding valid absolute difference value.

7. A noise measurement circuit as claimed in claim 6, wherein said limiter means comprises:

a limiter operable to limit or replace values of absolute differences which exceed a predetermined value and to supply a signal to reliability test means each time an absolute difference is limited or replaced; and said reliability test means operable to count the signals provided by said limiter and to supply a reliability signal when a predetermined level, preferably 25% of the calculated absolute differences for one field or frame, is exceeded.

8. A noise measurement circuit as claimed in claim 2, further comprising a normalizer means for dividing the accumulated absolute differences for one noise value by the predetermined number of accumulated absolute differences.

9. A television receiver comprising said noise measurement circuit as claimed in claim 2.

10. A noise measurement circuit as claimed in claim 2, wherein said limiter means comprises:

a limiter operable to limit or replace values of absolute differences which exceed a predetermined value and to supply a signal to reliability test means each time an absolute difference is limited or replaced; and said reliability test means operable to count the signals provided by said limiter and to supply a reliability signal when a predetermined level, preferably 25% of the calculated absolute differences for one field or frame, is exceeded.

* * * * *